(12) United States Patent  (10) Patent No.: US 7,463,730 B2
Katkam et al.  (45) Date of Patent: Dec. 9, 2008

(54) SYSTEM AND METHOD FOR CALLER CONFIRMATION OF CALL CENTER AGENT NOTES

(75) Inventors: Vinod Katkam, San Jose, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 625 days.

(21) Appl. No.: 11/244,698

(22) Filed: Oct. 6, 2005

(65) Prior Publication Data

US 2007/0116237 A1 May 24, 2007

(51) Int. Cl.
  *H04M 3/00* (2006.01)
(52) U.S. Cl. ............... 379/266.1; 379/265.01
(58) Field of Classification Search ............. 379/266.1, 379/265.01
See application file for complete search history.

(56) References Cited

U.S. PATENT DOCUMENTS

| | | | |
|---|---|---|---|
| 4,472,833 A | | 9/1984 | Turrell et al. |
| 5,249,223 A | | 9/1993 | Vanacore |
| 5,493,608 A | | 2/1996 | O'Sullivan |
| 5,537,470 A | | 7/1996 | Lee |
| 6,064,874 A | * | 5/2000 | Cox et al. ............. 455/404.1 |
| 6,137,862 A | | 10/2000 | Atkinson et al. |
| 6,333,980 B1 | | 12/2001 | Hollatz et al. |
| 6,567,848 B1 | | 5/2003 | Kusuda et al. |
| 6,587,545 B1 | | 7/2003 | Antonucci et al. |
| 6,654,458 B1 | | 11/2003 | Saleh |
| 6,675,216 B1 | | 1/2004 | Quatrano et al. |
| 6,697,457 B2 | | 2/2004 | Petrushin |
| 6,826,194 B1 | | 11/2004 | Vered et al. |
| 6,847,715 B1 | | 1/2005 | Swartz |
| 6,859,776 B1 | | 2/2005 | Cohen et al. |
| 6,879,685 B1 | | 4/2005 | Peterson et al. |
| 6,882,641 B1 | | 4/2005 | Gallick et al. |
| 7,039,166 B1 | * | 5/2006 | Peterson et al. .......... 379/88.18 |
| 7,127,058 B2 | * | 10/2006 | O'Connor et al. ...... 379/265.01 |

(Continued)

FOREIGN PATENT DOCUMENTS

EP    1 030 504 A2    8/2000

OTHER PUBLICATIONS

PTC/AU99/00247, Apr. 1, 1999, Matthaisson, Hoerdur.

(Continued)

*Primary Examiner*—Creighton H Smith
(74) *Attorney, Agent, or Firm*—The Law Offices of Bradley J. Bereznak

(57) ABSTRACT

A system includes a computer workstation associated with an agent of a call center and a subsystem that includes automatic call distributor (ACD) functions for connecting a caller to the computer workstation of the agent, the subsystem being connected with a device of the caller via an Internet Protocol (IP) network. The agent transmits a first message over the IP network to a device of the caller during the call. The first message contains notes electronically recorded by the agent. Prior to or coincident with an end of the call, the caller sends a second message back to the system confirming the agent's notes. It is submitted with the understanding that it will not be used to interpret or limit the scope or meaning of the claims. 37 CFR 1.72(b).

18 Claims, 3 Drawing Sheets

U.S. PATENT DOCUMENTS

| | | | |
|---|---|---|---|
| 2002/0090076 A1 | 7/2002 | Uppaluru et al. | |
| 2002/0196928 A1 | 12/2002 | Johnson et al. | |
| 2003/0185379 A1* | 10/2003 | O'Connor et al. | 379/265.02 |
| 2004/0109555 A1 | 6/2004 | Williams | |
| 2005/0059463 A1 | 3/2005 | Gilmore et al. | |
| 2005/0069102 A1 | 3/2005 | Chang | |
| 2005/0089053 A1 | 4/2005 | Zhu | |
| 2005/0286705 A1 | 12/2005 | Contolini et al. | |
| 2006/0093103 A1* | 5/2006 | Timmins et al. | 379/88.19 |
| 2006/0250978 A1* | 11/2006 | Lawrence | 370/252 |
| 2006/0251238 A1* | 11/2006 | Richartz et al. | 379/265.12 |

OTHER PUBLICATIONS

Nigel Ward and Satoshi Nakagawa, "Automatic User-Adaptive Speaking Rate Selection For Information Delivery", Jun. 25, 2002, (4 pages), University of Tokyo, Tokyo, Japan.

Jing Zheng, Horacio Franco, and Andreas Stolcke, "Rate Of Speech Modeling for Large Vocabulary Conversation Speech Recognition", May 18, 2001, (5 pages) Speech Technology and Research Laboratory SRI International, http://www.speech.sri.com.

L.Melscoet, "Alcatel CCweb: Marriage Of The Internet With The Call Center The Alcatel Ccweb Enables a Company to Combine Its Web Site And Call Center Into a Powerful Contact Center", Electrical communication, Alcatel, Brussels, BE, No. 1, 2000, (pp. 43-47).

D.Steul, "Redefining The Call Center: Customer Service On The Internet", Alcatel telecommunications Review, Alcatel, Paris Cedex, FR, Mar. 2000, (6 pages).

Melscoet, L. "Alcatel CCweb: Marriage of the Internet with the Call Center" Alcatel Telecommunications Review, Alcatel, Brussels, BE, vol. 2000, No. 1, pp. 43-47.

Steul, D. "Redefining the Call Center: Customer Service on the Internet" Alcatel Telecommunications Review, Alcatel, Paris CEDEX, FR, Mar. 2000, vol. 2000, No. 1, pp. 38-42.

* cited by examiner

SYSTEM AND METHOD FOR CALLER CONFIRMATION OF CALL CENTER AGENT NOTES

FIELD OF THE INVENTION

The present invention relates generally to the fields of telephony and call center communications; more specifically, to systems and methods for providing interactive services between a caller and a call center agent.

BACKGROUND OF THE INVENTION

Interactive voice response (IVR) systems that provide information and channel calls to service agents in response to the spoken words or touch tone signaling of a telephone caller have been deployed for more than a decade. The traditional call center for handling service calls was based on a private branch exchange (PBX) that included core automatic call distributor (ACD) functions for connecting a caller to one of a plurality of agents. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through the public switched telephone networks (PSTN) and Internet protocol (IP) enabled networks that support multi-channel (voice, e-mail, text chat, and Web collaboration) customer interaction.

By way of example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. U.S. Pat. No. 6,847,715 discloses a system for operatively integrating an ACD and an IVR unit in which an interaction input from a caller is stored and then transmitted to an appropriate agent workstation. U.S. Pat. No. 6,798,768 teaches multimedia call routing in an IP network. An Internet Protocol Network Telephony (IPNT) call center system wherein calls are routed to remote agents over the Internet in accordance with a set of business rules is described in U.S. Pat. No. 6,879,586.

Additionally, U.S. Pat. No. 6,940,963 teaches a system that allows an IVR system to gain control over an ACD call that has been routed to the IVR over Integrated Services Digital Network (ISDN) facilities employing Q-signaling (QSIG) protocol. The IVR informs the ACD server, such as a PBX or Private Integrated Services Network Exchange (PINX), that a critical transaction is occurring that should not be interrupted by the ACD. QSIG is a well known signaling protocol based upon ISDN Q.931 that is commonly used for signaling between nodes of a Private Integrated Services Network (PISN). Basically, QSIG allows products from different vendors to interwork together. QSIG can be used in multi-vendor PBX networking, attachment of ancillary equipment (e.g., voicemail systems, paging equipment, etc.) to a PBX network, Virtual Private Networks (VPN), broadband private networks, linking Trans-European Trunked Radio (TETRA) areas, and voice over Internet protocol (VoIP) applications.

According to a standard practice in call center systems, the call center agent takes notes of the call session by typing information into a computer, thereby creating an electronic record that may be stored in the ACD system. These notes generally contain special orders, information that the caller requested, and account agreements reached between the agent and the caller. For example, a caller may call to complain about an erroneous service charge to his account and request that the charge be reversed. In another instance, a cellular phone user may request that his service be temporarily disabled for a time period and request a waiver of the service fee during the period of nonuse. In cases such as these, the caller and agent usually arrive at a negotiated oral agreement, the terms of which are typically recorded in the ACD system by entry of the servicing agent's electronic (e.g., typed) notes. In the examples given, when the call is over the caller reasonable expects to receive a credit or fee waiver that will appear in his next billing statement.

The problem is that in many cases miscommunication or misunderstanding occurs between the caller and the agent. In other cases, the agent records or enters mistaken information, such that the agent's notes or user information entered into the ACD system does not reflect what the caller expected or understood. Unfortunately, when the user later calls back to the call center to complain about the mistake or misunderstanding, the notes recorded in the ACD system do not support the caller's recollection of the original agreement. As a result, human errors and misunderstandings that commonly happen during call center sessions can lead to customer dissatisfaction.

One solution to the problem of avoiding errors and misunderstandings between the caller and the agent involves sending an email to the caller after the end of the call session. The email notifies the caller of the content information entered into the ACD system by the agent. The drawback of this approach, however, is that it is not real-time communication. Not only have the agent's notes already been entered into the ACD, but there also is a delay between the time that the email message is transmitted and the time that the caller actually reads the email message. During this delay period, which may be several days or weeks, memories fade and the information content of the email message may differ from what the caller recollects. In the event that the caller disagrees with the information conveyed in the email notification, he must then try to correct the misunderstanding or error, e.g., by sending a reply email message or by placing another call to the call center. In either case, further delay is introduced and the likelihood of obtaining a satisfactory resolution to the matter is diminished.

What is needed is a mechanism that overcomes the drawbacks of the prior art and which permits a caller to acknowledge and confirm negotiated agreements with a call center agent, as reflected in the agent notes that are recorded in the ACD system, in real-time (i.e., during the call).

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
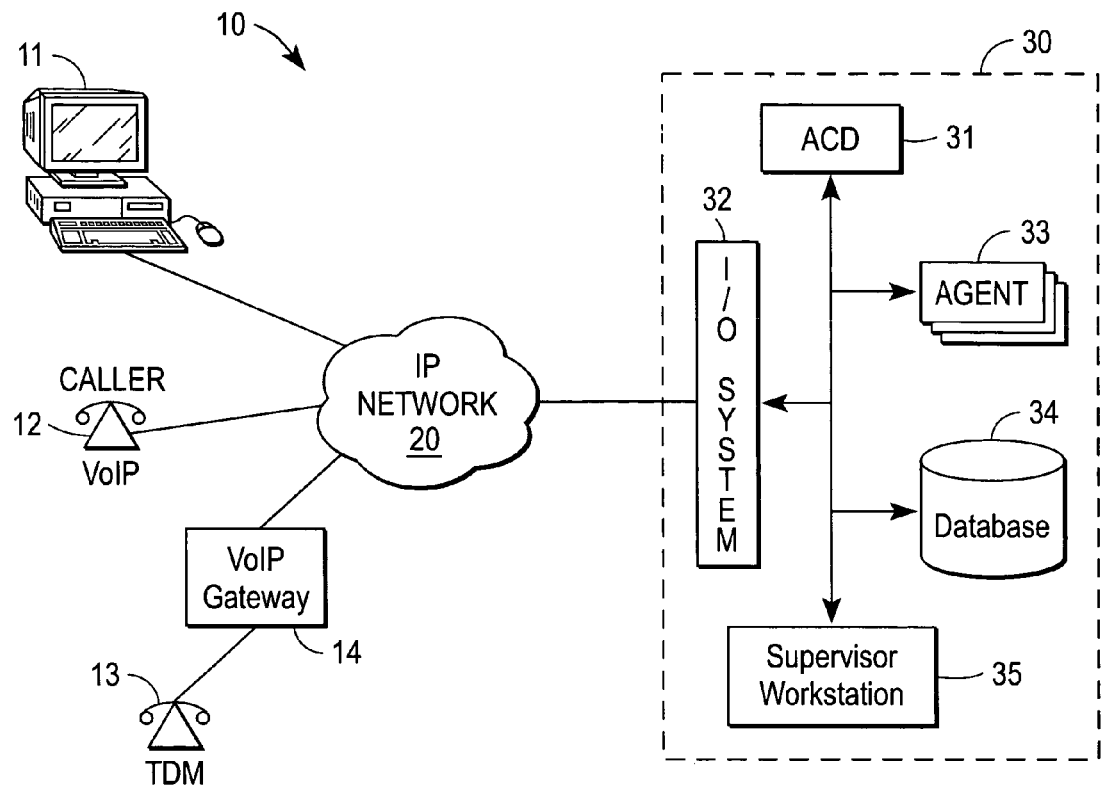
FIG. 1 is a conceptual block diagram of a system in accordance with one embodiment of the present invention.

A system and method that provides a caller with the ability to confirm a call center agent's notes during the call session is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a call center includes an ACD system that routes a call to an available agent, who records notes on a computer workstation during the call session with the caller. These notes may include information regarding the nature of the call as well as terms of any service agreement reached between the agent and the caller. At the end of the session, i.e., when the agent is through servicing the call, the agent electronically communicates either all of the notes, or a portion of the notes that contains the terms of the agreement, to the caller. In a particular implementation, the agent notes are communicated to the caller via an Extensible Mark-up Language (XML) text message sent to the caller over an IP network. The agent typically ends his participation in the call session after transmitting the notes to the caller.

The caller stays connected to the call center while reviewing the agent notes, and then either confirms or rejects those notes. That is, the call is not ended or terminated until the caller either hangs up or sends a response back to the call center. Confirmation of an agent's notes by a caller implies that—from the service provider's perspective—the caller has understood and accepted the deal presented by the agent (or the agreement negotiated between the agent and the caller). From the caller's perspective, confirmation also serves as verification of the same information.

In the case where the caller agrees with the content of the agent's notes, he may respond by entering a command (e.g., keypad entry) on his telephone that automatically sends a confirmation message back to the call center via the IP network. Alternatively, in certain implementations confirmation may be communicated back to the call center simply by the caller hanging up to end the call. When the ACD system of the call center receives confirmation of the agent notes from the caller, it enters those notes in an associated memory or database that provides an archival storage function.

In the event that the caller disagrees with the agent's notes of their call session, he may send a rejection reply message which, when received by the ACD system, causes the caller to be placed in a priority position in a queue. The caller is transferred out of the queue to speak with the agent who recorded the notes when that agent is available. The original notes of the agent are not archived by the ACD until the caller confirms or verifies the agent notes. In this way, the caller and agent may resume their call session to correct any misunderstanding or error in the agent's notes. Upon reaching a verbal agreement, the above process, which involves communication of the notes to the caller, followed by confirmation or rejection by the caller, is repeated.

The media path for the call center session between the caller and the agent may include audio (voice), text, and even video transmissions over an IP protocol network with connections that span across multiple services, systems, and devices (e.g., private branch exchange (PBX) systems, VoIP gateways, etc.). In a specific embodiment, the present invention may be implemented by software or hardware (firmware) installed in an ACD system of a call center. The caller telephone device may comprise any telephone with IP communication capabilities, a so-called "softphone" (a PC that has phone capabilities installed), or other IP phone/communication products. Alternative embodiments of the present invention may be implemented in PBX, telephony, telephone, and other telecommunications systems.

Referring to FIG. 1, an exemplary system 10 for caller confirmation of call center agent notes in accordance with one embodiment of the present invention is shown including a call center 30 connected with a plurality of users or callers (e.g., 11-13) via an IP network 20. For example, a caller may communicate with call center 30 across IP network 30 directly from a voice-over-IP (VoIP) phone 12, or from traditional time-division multiplexing (TDM) telephone device 13 connected to IP network 20 via a VoIP gateway 14. In another instance, the user may communicate with call center 30 utilizing a PC 11 that has telephony, telephone, and/or other telecommunications functions installed for placing packet-based calls over IP network 20. It is appreciated that PC 11 may also include a graphical user interface (GUI) comprising a collaborative web-based application (provided by the call center) that is accessed by the browser software running on PC 14. In other instances, the GUI running on PC 11 may comprise a downloaded application of computer-executable code that may be loaded or accessed by PC 11.

Continuing with the example of FIG. 1, call center 30 is shown including an ACD system 31 coupled with a plurality of agents 33, an addressable memory or database 34, an input/output (I/O) system 16 coupled with IP network 20, and a supervisor workstation 14. ACD 11 is normally configured to receive and service calls from a variety of sources via I/O system 16, which interfaces with devices (e.g., routers) associated with IP network 20. When an incoming call is received at call center 30, it is normally routed by ACD 11 to a computer workstation of the next available agent 33.

Figure 2:
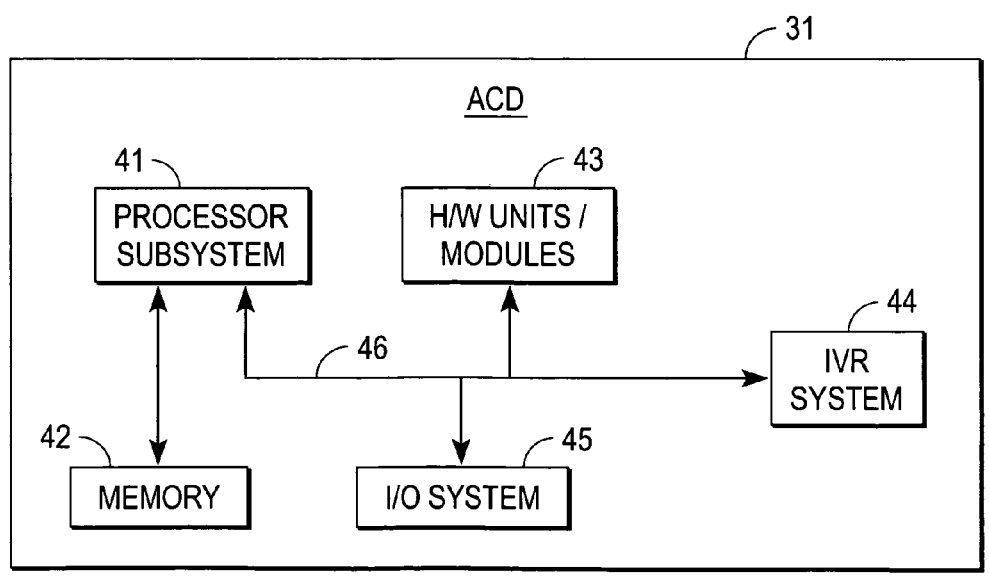
FIG. 2 is a block diagram of an ACD system according to one embodiment of the present invention.

FIG. 2 is a block diagram of ACD 31 according to one embodiment, which shows ACD 31 including a processor subsystem 41 comprising one or more processors coupled with various hardware (or software) units or modules 43. Commonly included is a historical reporting module that operates to build up the call history as it develops for use by the various agents during the call center session. In certain implementations, modules 43 may include known text-to-speech (TTS) and speech-to-text (STT) converters for use with an interactive voice response (IVR) system 44. Modules 43 may also optionally include code for generating a visual user interface for a caller communicating with the call center via a personal computer. Processor subsystem 41 is also shown coupled with an addressable memory 42 and an input/output (I/O) subsystem 45. Data may be transferred between memory 42 and processor subsystem 81 over a dedicated memory bus, and between the processor and I/O subsystems over a system bus 46.

In this example, IVR system 44 is coupled with processor subsystem 41 via bus 46, and provides information and channels calls to call center service agents in response to the spoken words or touch tone signaling of a telephone call. In other embodiments, IVR 44 may be configured as a separate system from ACD 31 within call center 30. In a particular implementation, IVR 44 may be utilized to communicate an agent's notes to a caller via speech (e.g., text-to-speech) and/or to receive a spoken confirmation or rejection message from a caller.

In an alternative embodiment, contact center 30 may be implemented as single-server, integrated "contact-center-in-a-box" that receives and routes calls to a plurality of service agents. A single-server approach may enhance contact-center efficiency, reduce business costs, and improve customer response by simplifying business application integration, easing agent administration, increasing agent flexibility, and providing efficiency gains in network hosting. For example, a single (or multiple) server contact center architecture may provide ACD functions, including conditional routing, call-in-queue and expected-wait-time messages, enterprise data displays, real-time data, and historical reporting.

There are a number of different mechanisms by which a caller may receive and then confirm/reject an agent's recorded notes. In each case, the notes are communicated to the caller's telephone device across IP network 20 and either displayed as text or played out to the caller as speech on the caller's telephone device. After receiving the notes, the caller may either confirm or reject the notes. For example, if the notes reflect his understanding of the agreement reached during the call session with the agent, the caller may confirm the notes by entering a command that triggers an appropriate response message, or simply by speaking an appropriate response. If, on the other hand, the caller disagrees with the content of the agent's notes, or if he wants clarification, he may respond in like manner to reject the notes that have been communicated.

Figure 4:
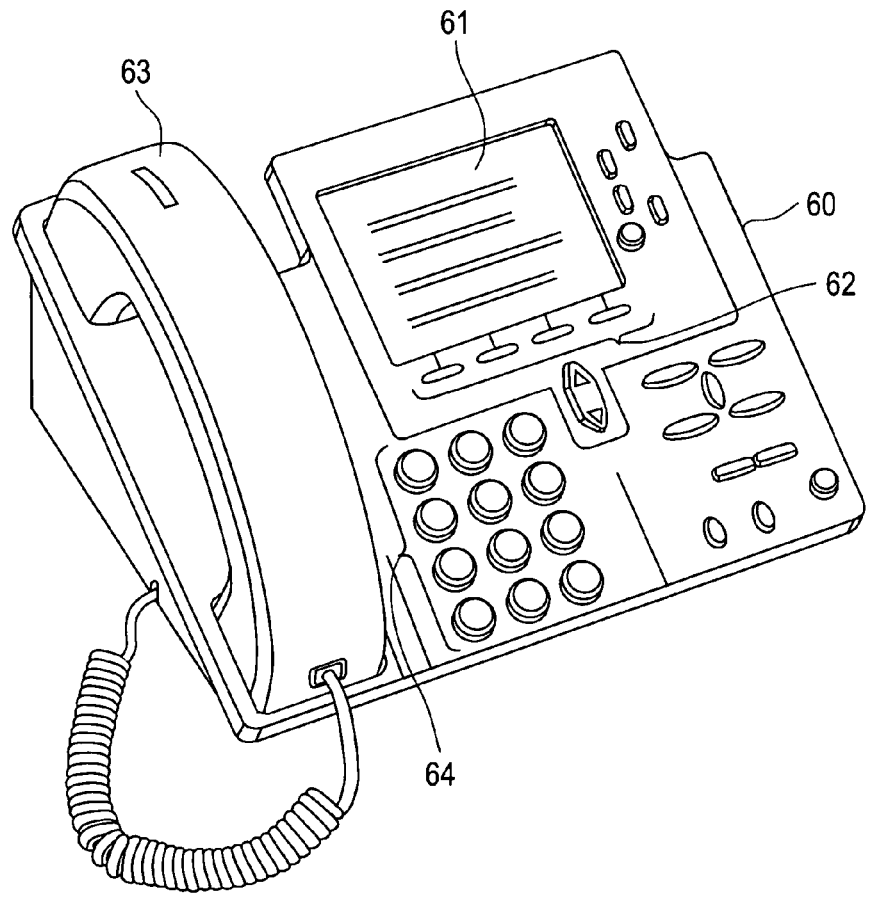
FIG. 4 shows an IP telephone utilized in accordance with one embodiment of the present invention.
Figure 5:
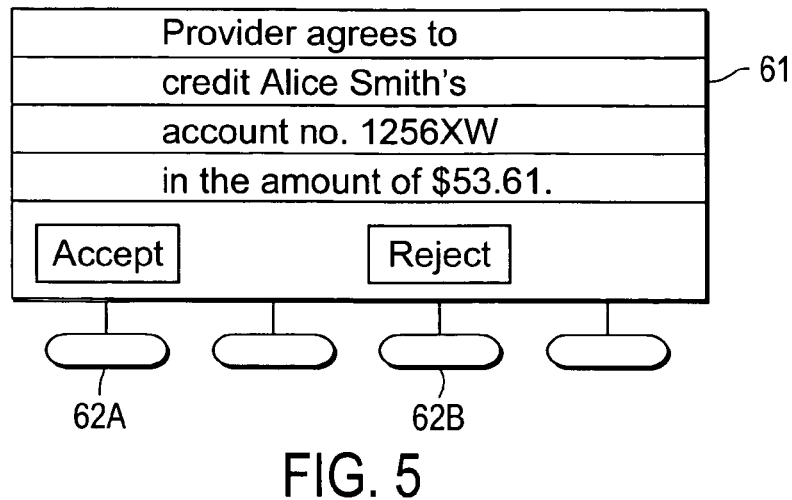
FIG. 5 is a portion of an IP telephone illustrating an exemplary transaction in accordance with one embodiment of the present invention.

FIG. 4 is a perspective view of an IP phone 60 that may be utilized by a caller to a call center in accordance with one embodiment of the present invention. IP phone 60 includes a liquid crystal display (LCD) panel 61, dynamic softkeys 62, a handset 63, and an alphanumerical keypad 64. Softkeys 62 support information services including XML text messaging capabilities that may be used for confirming or rejecting agent notes. By way of example, FIG. 5 shows an agent's notes displayed as a text message on LCD panel 61, with softkeys 62A and 62B functioning as single-button inputs to allow the caller to either confirm (i.e., accept) or reject the notes being displayed. In this case the agent notes communicated to the caller state, "Provider agrees to credit Alice Smith's account no. 1256XW in the amount of $53.61." In response, the caller may either press softkey 62A or softkey 62B, the effect of which respectively causes IP phone 60 to send either a confirmation or rejection message back to the call center.

In certain embodiments, the call center applications may provide a predefined input key or command that gives a caller the option to request confirmation of the agent's notes. In other words, instead of having the agent send his or her notes routinely at the end of each call session, the caller is provided with the option of requesting the notes from the agent at the end of the session. When the caller invokes the request confirmation option (e.g., via softkey command or IVR response), the agent's notes are either displayed as XML text on the caller's IP phone or played out as speech, e.g., using a text-to-speech converter. (It is appreciated that during the confirmation process, only the user relevant information is sent to the caller; that is, call center private data is not shared with the caller.)

In a particular embodiment, to avoid having the agent wait on the line during the confirmation process the agent leaves the call once the notes have been communicated to the caller. This approach increases productivity by allowing the agent to service other callers. As discussed above, if the caller rejects the notes during the confirmation process (e.g., due to errors in the notes or further questions/clarification) the caller is then queued back by the ACD system as a next caller for the same agent.

Figure 3:
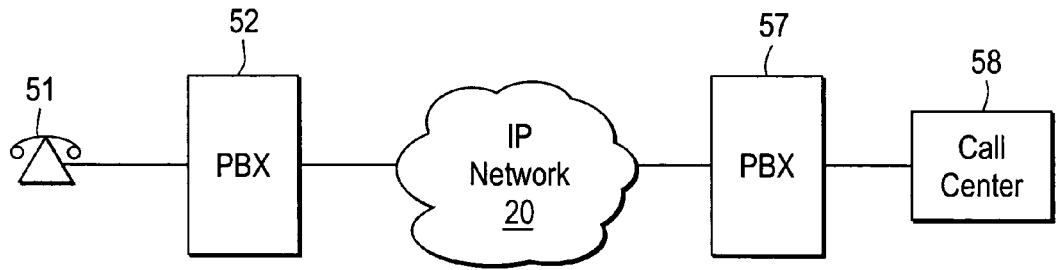
FIG. 3 illustrates a block diagram of a system in accordance with another embodiment of the present invention.

In another alternative embodiment, FIG. 3 illustrates a network architecture for caller confirmation of agent notes in which a call may be placed using a VoIP phone 51 that connects to an Internet Protocol (IP) software-based business PBX phone system 52 that provides call routing of voice over IP (VoIP) calls. An IP-PBX system 57 associated with call center 58 may comprise software or hardware (firmware) that includes executable code to implement the functionality and features described herein.) By way of example, Q-signaling (QSIG) protocol may be utilized between IP-PBX systems 52 and 57 to accommodate different vendor PBX networking and for interworking among different products/systems that may include a variety of telephone devices from different vendors.

Figure 6:
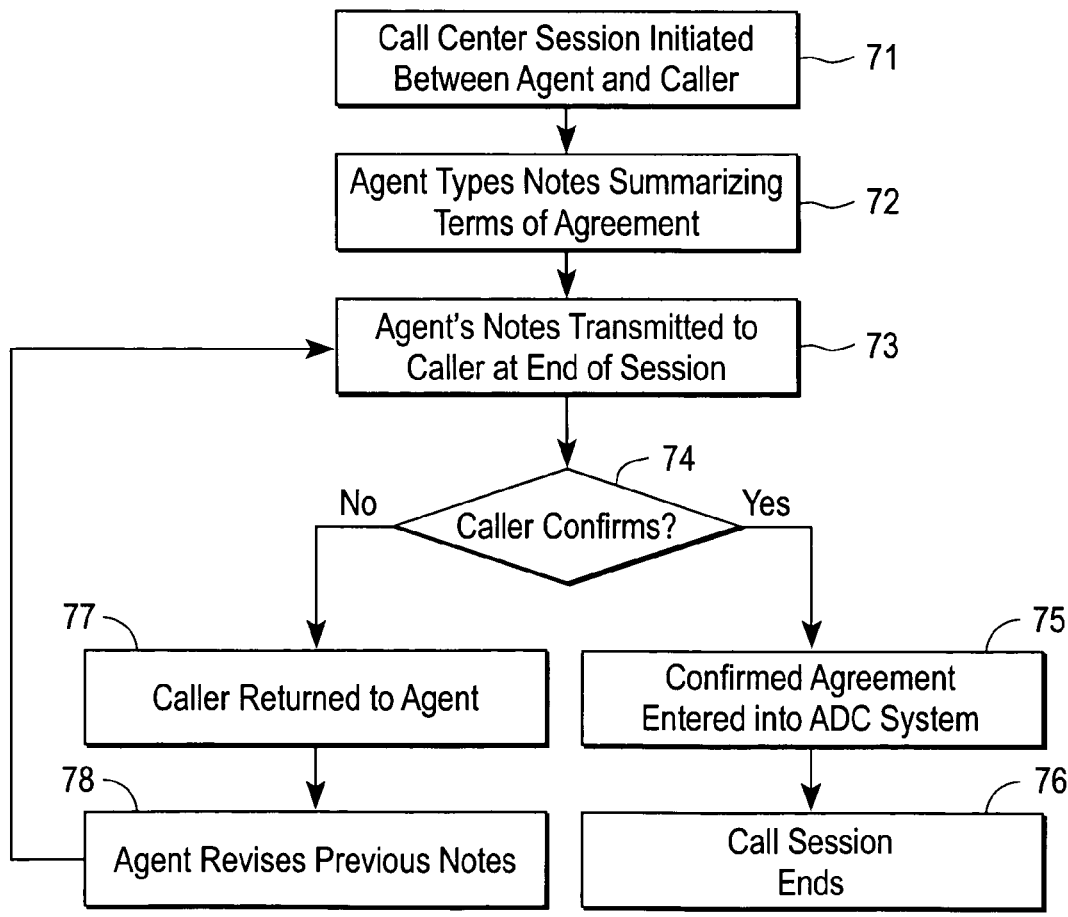
FIG. 6 is a flow diagram of a method of operation for a call center system according to one embodiment of the present invention.

FIG. 6 is a flowchart diagram that illustrates a method of operation according to one embodiment of the present invention. The process starts (block 71) when a call is received and routed by the ACD to an agent associated with the call center. The agent then types notes in his computer workstation to record salient points of discussion, issues, and/or agreements reached during the call session (block 72). At the end of the call session between the agent and the caller, or in response to a request for confirmation sent by the caller, all or a portion of the agent's notes are electronically transmitted to the caller over the network connection (block 73).

Once the notes have been transmitted to the caller, the agent may leave the call in order to service other callers. Meanwhile, the caller, who receives the notes either as text or as speech on his telephone device, has to decide whether to confirm or reject the communicated notes (decision block 74). In the event that the caller confirms the notes, a confirmation message is sent back to the call center, which results in the notes being entered into the ACD system; that is, stored in a memory or database (block 75). It should be understood that the confirmation response of the caller may be sent prior to or coincident with an end of the call, i.e., when the caller hangs up. At this point the call session ends (block 76).

In the alternative case where the caller rejects the agent notes, the caller is placed in a waiting queue to be eventually returned to the same agent (block 77). After further discussion between the agent and the caller, the agent may revise, alter, or append his notes (block 78), with the confirmation process then being repeated.

It is appreciated that there may be situations in which no agreement or confirmation can be reached. In other words, the above process—wherein the caller rejects the agent's notes, the notes are revised, and then the revised notes are communicated to the caller—may be repeated a number of times without a mutually satisfactory resolution of the issue presented by the caller. In certain implementations, after a predetermined number of iterations, or upon a determination by the agent (or supervisor) that no agreement can be reached, the call may be terminated and an appropriate notation entered into the ACD system.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For example, in certain implementations the waiting room may be subdivided into areas that provide different categories of meeting participation. For example, there may be an area that allow individuals to audit (i.e., listen but not speak) main conference room discussions in addition to an area that completely isolates individuals from the main conference room. Yet another subdivision area might be used to preclude persons from entering into a breakout session while in the waiting room. Accordingly, the specification and drawings are to be regarded in an illustrative rather than a restrictive sense.

We claim:

1. A method of servicing a telephone call from a caller to a call center comprising:
   communicating notes of an agent to the caller during the telephone call, the notes being electronically recorded by the agent;
   receiving a confirmation response from the caller confirming the notes, the confirmation response being sent prior to or coincident with an end of the telephone call; and
   entering the notes into a memory associated with an automatic call distributor (ACD) of the call center.

2. The method of claim 1 wherein the notes memorialize an agreement reached between the agent and the caller during the telephone call.

3. The method of claim 1 wherein the network comprises an Internet Protocol (IP) network.

4. The method of claim 3 wherein the notes are transmitted as an Extensible Mark-up Language (XML) text message.

5. The method of claim 1 further comprising:
   receiving a rejection response from the caller that rejects the notes;
   placing the caller in a priority position of a queue for the agent;
   altering the notes by the agent; and
   communicating the altered notes to the caller over the network during the telephone call.

6. The method of claim 4 further comprising:
   displaying the XML text message on an IP telephone of the caller during the call.

7. The method of claim 4 further comprising:
   playing the XML text message as speech on a telephone device of the caller during the telephone call using a text-to-speech converter.

8. A call center for servicing a telephone call from a caller comprising:
   means for electronically communicating notes of an agent to the caller, the notes being electronically recorded by the agent; and
   means for electronically storing the notes upon receipt of a confirmation message from the caller, the confirmation message being sent by the caller prior to or coincident with an end of the telephone call.

9. A system for servicing a telephone call from a caller to a call center comprising:
   a computer workstation associated with an agent of the call center,
   a subsystem that includes automatic call distributor (ACD) functions for connecting the caller to the computer workstation associated with the agent, the subsystem being connected with a device of the caller via an Internet Protocol (IP) network, and
   wherein the computer workstation is operable to transmit a first message over the IP network to the device of the caller during the telephone call, the first message containing notes electronically recorded by the agent, the computer workstation being further operable to receive a second message sent from the device of the caller prior to or coincident with an end of the telephone call, the second message confirming the notes.

10. The system of claim 9 wherein the subsystem comprises a private branch exchange (PBX).

11. The system of claim 9 further comprising:
    a memory associated with the unit, the computer workstation being further operable to enter the notes in the memory upon receipt of the second message.

12. The system of claim 9 wherein the device of the caller comprises an IP telephone.

13. The system of claim 9 wherein the device of the caller comprises a personal computer (PC).

14. The system of claim 9 wherein the first message comprises an Extensible Mark-up Language (XML) text message.

15. A computer program product comprising a computer useable medium and computer readable code embodied on the computer useable medium, execution of the computer readable code causing the computer program product to:
    communicate notes of a call center agent to a caller, the notes being electronically recorded by the call center agent during a telephone call with the caller; and
    enter the notes into a memory associated with an automatic call distributor (ACD) of the call center upon receipt of a confirmation response from the caller confirming the notes, the confirmation response being sent by the caller prior to or coincident with an end of the telephone call.

16. A computer program product comprising a computer useable medium and computer readable code embodied on the computer useable medium, execution of the computer readable code causing the computer program product to:
    communicate notes of a call center agent to a caller, the notes being electronically recorded by the call center agent during a telephone call with the caller;
    receive a confirmation response from the caller confirming the notes, the confirmation response being sent by the caller prior to or coincident with an end of the telephone call; and
    enter the notes into a memory associated with an automatic call distributor (ACD) of the call center.

17. The computer program product of claim 16 wherein execution of the computer readable code further causing the computer program product to:
    receive a rejection response from the caller that rejects the notes;
    place the caller in a priority position of a queue for the call center agent; and
    communicate altered notes of the agent to the caller during the telephone call.

18. The computer program product of claim 17 wherein execution of the computer readable code further causing the computer program product to:
    transmit the notes as an Extensible Mark-up Language (XML) text message.

* * * * *